July 19, 1938.　　R. C. OSGOOD ET AL　　2,123,909
SCRAPER LOADING APPARATUS
Filed Sept. 3, 1936　　4 Sheets-Sheet 1
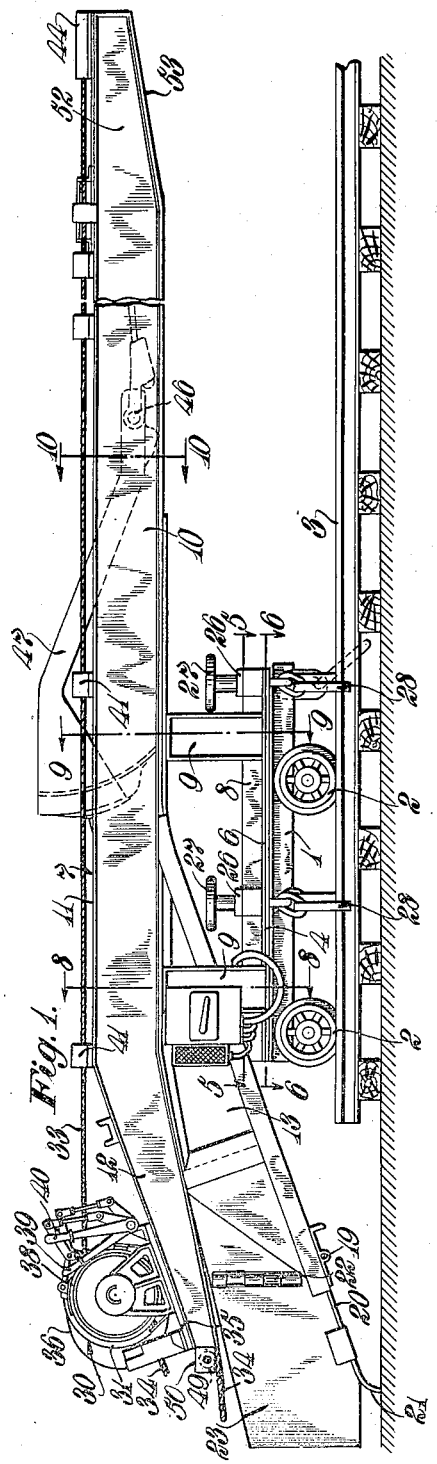
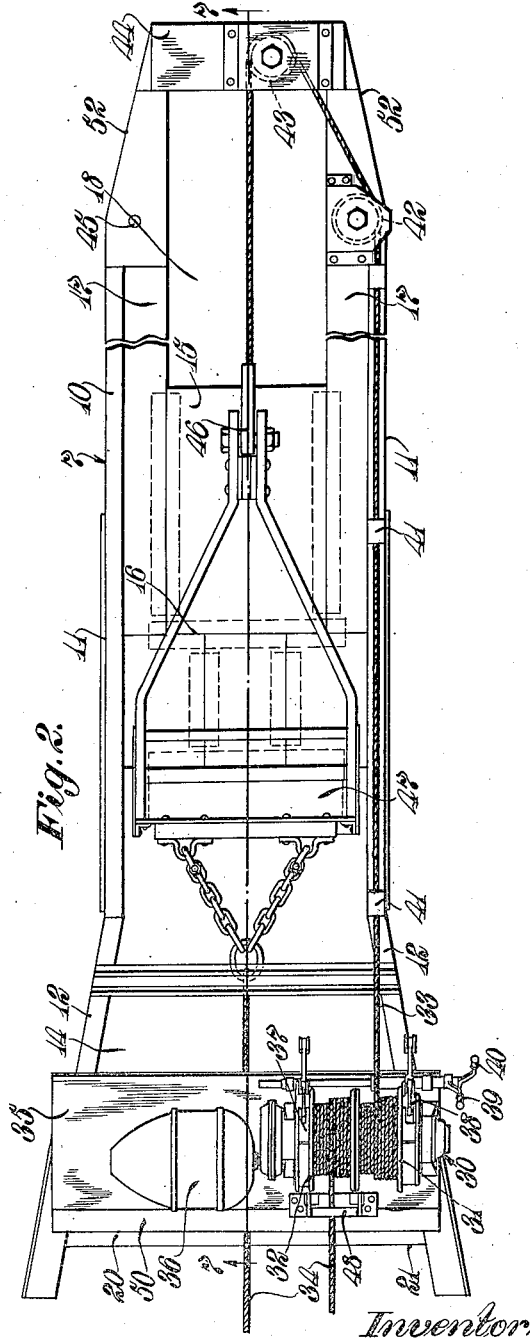
Inventors:
Robert C. Osgood.
Leslie A. Currier.
by Louis A. Martin
Atty.

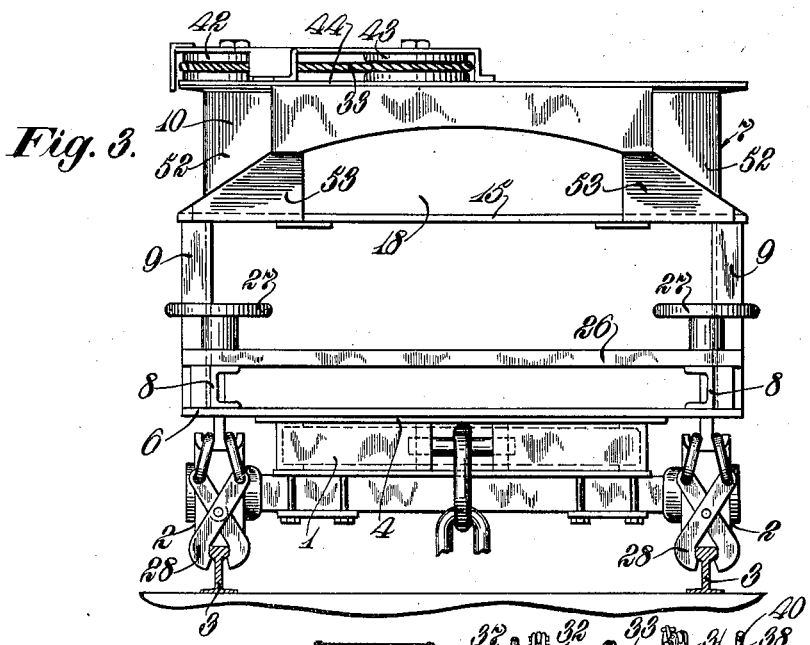
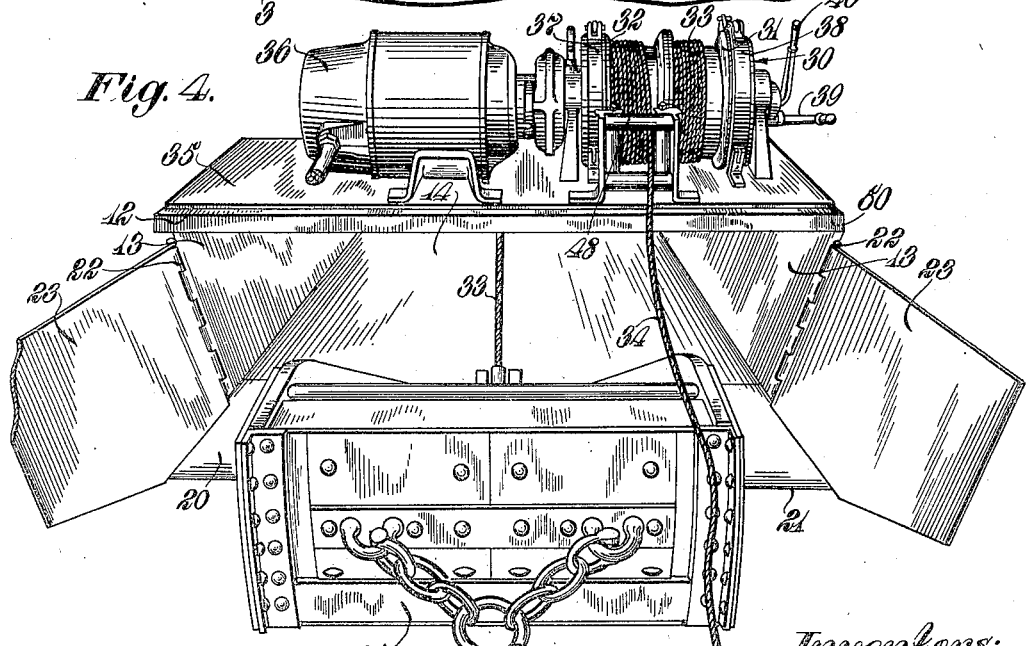

July 19, 1938.  R. C. OSGOOD ET AL  2,123,909
SCRAPER LOADING APPARATUS
Filed Sept. 3, 1936  4 Sheets-Sheet 3

Inventors:
Robert C. Osgood.
Leslie A. Currier.
by Louis A. Maxson.
Att'y.

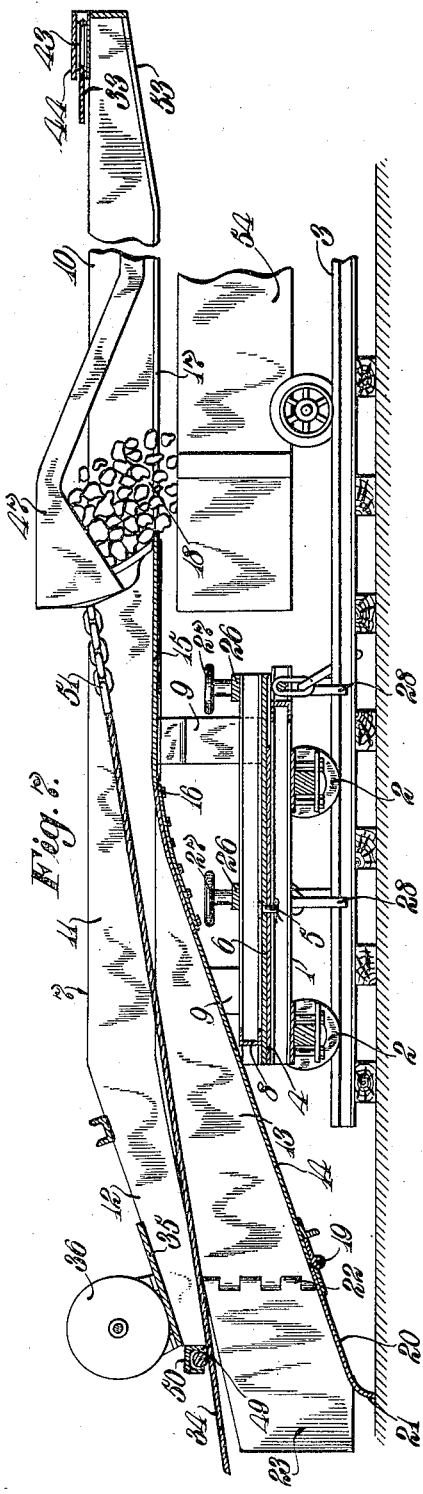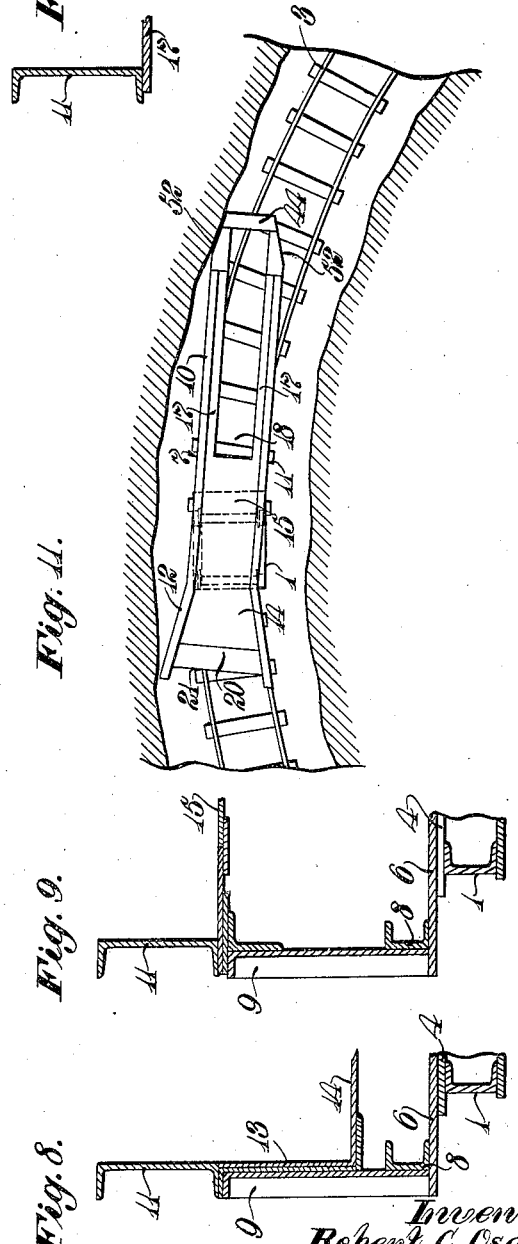

Patented July 19, 1938

2,123,909

UNITED STATES PATENT OFFICE 2,123,909

SCRAPER LOADING APPARATUS

Robert C. Osgood and Leslie A. Currier, Claremont, N. H., assignors to Sullivan Machinery Company, a corporation of Massachusetts Application September 3, 1936, Serial No. 99,228

18 Claims. (Cl. 214—110)

This invention relates to loading apparatus, and more particularly to improvements in a loading apparatus especially designed to use with a hoist operated scraper mechanism.

An object of this invention is to provide an improved loading apparatus. Another object is to provide an improved loading apparatus especially designed to use with a hoist operated scraper mechanism whereby the material to be loaded may be moved by the scraper into an elevated position for discharge into a suitable receptacle. A further object is to provide an improved loading slide. Another object is to provide an improved rock loading slide particularly adapted for use in scraper loading work. Still another object is to provide an improved rock loader slide of extremely simple and rugged construction and low in height. A still further object is to provide an improved scraper loading apparatus wherein but a single rigid horizontal boom structure is mounted on a portable base and has its front and rear end portions overhanging the ends of the base, the front overhanging end of the boom structure entirely supporting the hoisting mechanism for operating the scraper of the scraper mechanism. Other objects and advantages of the invention will, however, hereinafter more fully appear.

In the accompanying drawings there is shown for purposes of illustration one form which the invention may assume in practice.

In these drawings,—

Fig. 1 is a side elevational view of the illustrative embodiment of the improved loading apparatus.

Fig. 2 is a top plan view of the loading apparatus shown in Fig. 1.

Fig. 3 is an enlarged rear elevational view of the improved loading apparatus.

Fig. 4 is an enlarged front elevational view of the improved loading apparatus showing the scraper in operative loading position with respect thereto.

Fig. 7 is a view in longitudinal section taken substantially on line 7—7 of Fig. 2, showing the scraper in material discharging position thereon.

Fig. 8 is a detail vertical sectional view taken substantially on line 8—8 of Fig. 1.

Fig. 9 is a detail vertical sectional view taken substantially on line 9—9 of Fig. 1.

Fig. 10 is a detail vertical sectional view taken substantially on line 10—10 of Fig. 1.

Fig. 11 is a diagrammatic view showing the apparatus moving through a curved mine passage with the loading slide swiveled with respect to the base to facilitate movement of the apparatus through the passage.

Figure 5:
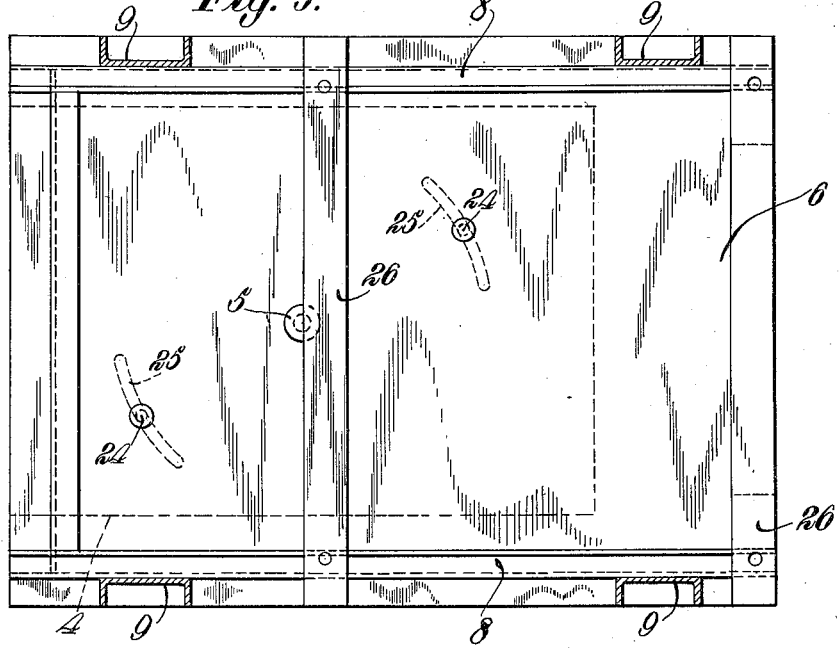
Fig. 5 is an enlarged horizontal sectional view taken substantially on line 5—5 of Fig. 1.
Figure 6:
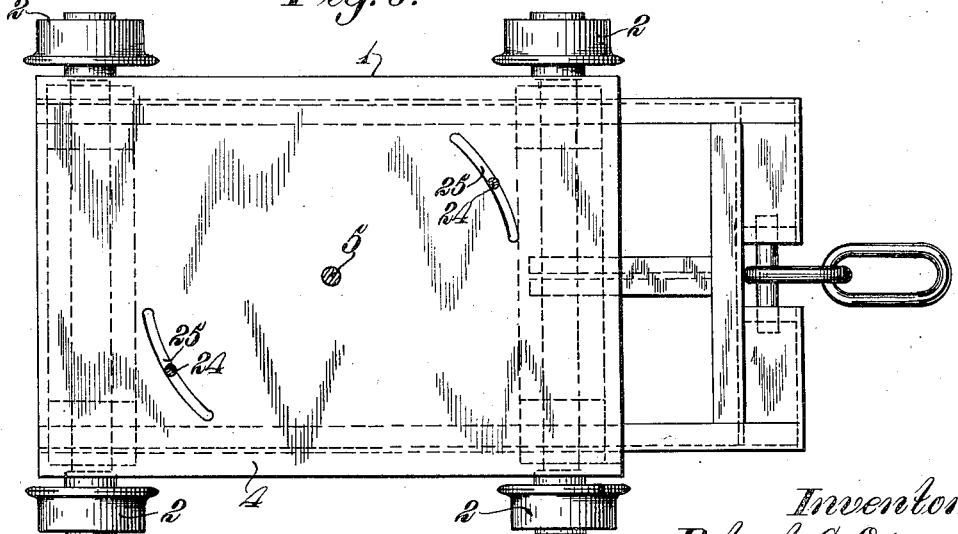
Fig. 6 is an enlarged horizontal sectional view taken substantially on line 6—6 of Fig. 1, showing the swivel base.

In this illustrative embodiment of the invention there is shown a loading apparatus of the type commonly known as a loading slide, especially designed to use with a hoist operated scraper mechanism, and particularly adapted for loading rock in tunnel work. It will be evident, however, that the improved loading apparatus may be used for loading loose material in any suitable type of work, such as loading ore in mines.

In this illustrative construction there is shown a portable base 1, herein in the form of a truck frame, mounted on truck wheels 2 adapted to travel along a trackway 3. Secured to the top of the truck frame 1 is a horizontal plate 4 on which is swiveled, on a vertical axis at 5, a horizontal plate 6. Mounted on the horizontal plate 6 is the improved loading slide generally designated 7. Referring more particularly to the loading slide, it will be noted that secured to the top surface of the horizontal plate 6 are channel bars 8, while mounted on the plate 6 and secured to the channel bars 8 are vertical channel bars 9. Superimposed on the base and supported by the vertical channel bars 9 is but a single rigid horizontal elongated beam or loading boom 10 comprising parallel side channel bars 11, 11 suitably rigidly secured together, the horizontal boom having its rearward end portion overhanging a substantial distance the rear end of said base and provided with a downwardly bent forward end overhanging the front end of the base. Secured to the channel bars 11 of the loading boom rearwardly of said inclined overhanging forward end thereof and to the vertical channel bars 9 are vertical side plates 13 outwardly flared at the front of the slide and in turn having secured thereto a downwardly and forwardly inclined bottom plate 14, while arranged between the rearward portion of the horizontal beam and the vertical bars 9 and secured thereto is a horizontal plate 15, the plates 14 and 15 being joined at 16 (Fig. 7) to form a bottom slide, as will later be described. Fixed to the horizontal beam rearwardly of the horizontal slide plate 15 are horizontal side plates 17 having their top surfaces flush with the top surface of the plate 15, and these side plates cooperate with the plate 15 to provide a discharge opening 18 rearwardly of the rear edge of the plate 15.

As shown most clearly in Fig. 7, horizontally pivoted at 19 on the forward extremity of the inclined slide plate 14 is a plate 20 having a curved forward end or receiving nose 21 adapted to rest on the ground surface, while pivotally mounted on upstanding axes at 22 on the flared portions of the vertical plates 13 at the opposite sides of the slide are horizontally swingable side wings 23. The horizontal plate 6, together with the slide structure carried thereby, are, as above mentioned, horizontally swiveled with respect to the base about a vertical axis at 5, and the means for locking the plates 4 and 6 together comprises bolts 24 carried by the upper plate 6 and passing through arcuate slots 25 formed in the lower plate 4, the slots being formed on radii struck from the center of the pivot 5. These slots permit swiveling of the plate 6 with respect to the plate 4 when the bolts 24 are loosened, and when the latter are tightened the plates are locked together. Mounted on horizontal cross bars 26 supported by the channel bars 8 are hand wheels 27 for operating screw adjusting devices connected to usual rail clamps or grips 28 so that the apparatus may be clamped in a stationary position on the trackway in an obvious manner.

In this illustrative construction, mounted in a relatively low position on the inclined overhanging forward end portion of the beam 10 is a hoisting mechanism generally designated 30. The hoisting mechanism is supported entirely by the overhanging front end of the boom wholly independently of the underlying slide structure. This hoisting mechanism may be of the same general character as that described in Patent No. 1,740,707, to R. C. Osgood, patented December 24, 1929, although it will be evident that various types of hoisting mechanisms may be employed. This hoisting mechanism is of the double drum type comprising a pull rope drum 31 and a tail rope drum 32, these drums having respectively wound thereon pull and tail ropes 33 and 34. The hoisting mechanism is supported on a transverse plate 35 secured to the upper surfaces of the inclined portions 12 of the channel bars 11 and the pull and tail rope drums are driven, as clearly described in the above mentioned patent, by a motor 36 through suitable gearing under the control of brake bands 37 and 38, respectively. These brake bands are operated by suitable control levers 39 and 40 conveniently located at the side of the apparatus. The pull rope 33 is adapted to extend from the drum 31 through suitable guides 41 in the form of eyelets mounted on the top of one of the channel bars 11, and passes around horizontal guide sheaves 42 and 43, the latter being supported by a cross frame 44 secured to the rearward ends of the channel bars 11 of the horizontal beam. An opening 45 is formed in the opposite side of the boom structure so that the guide sheave 42 may be transposed to the opposite side of the apparatus, and the position of the hoisting mechanism may be reversed in case a right hand control is desired. The pull rope extends around the guide sheave 43 forwardly into connection at 46 to a scraper 47 of a conventional design, herein preferably of the hoe box type. The tail rope extends from the tail rope drum 32, beneath a guide roll 48 forwardly of the apparatus, to a suitable pulley (not shown) located adjacent the material to be loaded, the tail rope passing around this pulley rearwardly beneath a horizontal guide roll 49 journaled on a horizontal channel bar 50 secured to the forward ends of the channel bars 11 in the manner shown in Fig. 7. The tail rope extends beneath the guide roll 49 rearwardly into connection at 51 with the scraper. The opposite sides of the rearward portion of the horizontal beam 10 are inwardly and rearwardly inclined at 52, while the lower surfaces of the channel bars 11 are upwardly and rearwardly inclined at 53. The inclined sides 52 provide clearance for the rearward end of the beam as the loading apparatus moves through a curved mine passage.

The mode of operation of the improved loading apparatus will be clearly apparent from the description given. A suitable receptacle such as a mine car 54 is adapted to be placed beneath the overhanging extremity of the horizontal beam 10 directly below the discharge opening 18. The hoisting mechanism may be operated to move the scraper 46 back and forth toward and from the pile of material to be loaded, and the scraper is adapted to engage the material and drag the material toward the loading apparatus and up the inclined slide until the scraper assumes the position directly above the discharge opening 18 as shown in Fig. 7, the material then being discharged by gravity from the scraper, directly into the mine car. The pivoted bottom plate 20 and the pivoted side plates 23 cooperate to direct the scraper and material to be loaded onto the slide, and as the scraper moves upwardly along the inclined portion of the slide it passes beneath the transverse supporting plate 35 on which the hoisting mechanism is supported. It will thus be seen that the scraper may be rapidly moved toward and from the pile of material to be loaded, the scraper moving directly up the slide of the loading apparatus and discharging the material directly into the waiting mine car, thereby eliminating the necessity of belt conveyors and other complicated mechanism. The swivel type base, as shown in Fig. 11, facilitates movement of the loading apparatus through a curved mine passage of small radius, it being possible to swivel the loading slide with respect to the base as the apparatus moves through the curved passage. It will also be evident that by providing the horizontal beam or boom structure on which the scraper slideway is formed and by supporting the hoisting mechanism directly on the downwardly inclined portion of the horizontal beam structure the apparatus is rendered extremely low in height. As the scraper moves upwardly along the inclined slide plates 14 and 15 into its discharging position, as shown in Fig. 7, it is guided directly by these plates, and when the scraper moves rearwardly beyond the position shown in Fig. 7 wherein it overlies the discharge opening 18 it is guided by the horizontal side plates 17 located at the sides of the discharge opening. Other uses and advantages of the improved scraper loading apparatus will be clearly apparent to those skilled in the art.

While there is in this application specifically described one form which the invention may assume in practice, it will be understood that this form of the same is shown for purposes of illustration and that the invention may be modified and embodied in various other forms without departing from its spirit or the scope of the appended claims.

What we claim as new and desire to secure by Letters Patent is:

1. In a scraper loading apparatus, a portable base, a horizontal frame mounted between its ends on and solely supported by said base and having its rearward end freely overhanging a substantial distance the rear end of said base, the forward portion of said frame being downwardly inclined and freely overhanging the front end of said base, said frame providing a slideway beneath the front overhanging end of said frame and along which a loading scraper is adapted to move, and a hoisting mechanism mounted on and supported by said downwardly inclined overhanging forward portion of said frame, said hoisting mechanism having pull and tail rope drums for actuating the loading scraper.

2. In a scraper loading apparatus, a portable base, a horizontal frame mounted between its ends on and solely supported by said base and having its rearward end freely overhanging a substantial distance the rear end of said base, the forward portion of said frame being downwardly inclined and freely overhanging the front end of said base, said frame providing a slideway beneath the front overhanging end of said frame and along which a loading scraper is adapted to move, a hoisting mechanism mounted on and supported by said downwardly inclined overhanging forward portion of said frame, said hoisting mechanism having pull and tail rope drums for actuating the loading scraper, and rope guiding means for guiding the pull rope of the hoisting mechanism, said guiding means including a guide sheave mounted on the rear end of said horizontal frame.

3. In a scraper loading apparatus, a portable base, a horizontal frame mounted on said base and having its rearward end overhanging a substantial distance the rear end of said base, the forward portion of said frame extending in advance of said base and being downwardly inclined and overhanging the front end of said base, said frame providing a slideway along which a loading scraper is adapted to move for moving loose material from the ground surface onto said slideway, a hoisting mechanism mounted on and supported by said downwardly inclined overhanging forward portion of said frame in advance of said base, said hoisting mechanism having pull and tail rope drums for actuating the loading scraper along said slideway, and rope guiding means for guiding the pull and tail ropes of the hoisting mechanism, said guiding means including a pull rope guide sheave mounted on the rear overhanging end of said horizontal frame and a tail rope guide mounted on the forward overhanging end of said frame.

4. In a scraper loading apparatus, a portable base, a vertical supporting structure mounted on said base, a horizontal beam structure mounted between its ends on and solely supported by said supporting structure and having its forward and rearward ends freely overhanging a substantial distance the front and rear ends of said base, a slide formed on said supporting and beam structures and extending beneath the front overhanging end of said beam structure and along which a loading scraper is adapted to move, and a hoisting mechanism mounted on and supported wholly by the forward overhanging end of said horizontal beam structure for operating the loading scraper.

5. In a scraper loading apparatus, a portable base, but a single rigid horizontal boom mounted on and overlying said base, said boom having a horizontal boom portion overhanging a substantial distance the rear end of said base and a downwardly inclined forward boom portion overhanging the front end of said base, a slide associated with said boom and adapted to guide a loading scraper for moving the material to be loaded into discharge position on the rearward portion of said boom, and a hoisting mechanism adapted to operate the loading scraper and having cable winding drums and cable guiding means mounted at the remote ends of said boom on said front and rear overhanging boom portions.

6. In a scraper loading apparatus, a portable base, but a single rigid horizontal boom mounted between its ends on and overlying said base, said boom solely supported by said base and having a horizontal boom portion freely overhanging a substantial distance the rear end of said base and a downwardly inclined forward boom portion freely overhanging the front end of said base, a slide associated with said boom and adapted to guide a loading scraper for moving the material to be loaded into discharge position on the rearward portion of said boom, said slide located beneath said forward overhanging boom portion and supported by said base independently of said boom, and a hoisting mechanism mounted on and supported wholly by the forward overhanging boom portion and operatively connected to the loading scraper.

7. In a scraper loading apparatus, a base, a supporting structure on said base, but a single rigid horizontal boom mounted on said supporting structure and overlying said base, said boom having a rearward boom portion overhanging a substantial distance the rear end of said base and a forward boom portion overhanging the front end of said base, a slide supported by said supporting structure and said rearward boom portion and along which a loading scraper is adapted to move, the front portion of said slide being forwardly and downwardly inclined, said overhanging front boom portion overlying the inclined forward portion of said slide and spaced from the latter, and a hoisting mechanism for operating the loading scraper for moving the latter up said inclined slide into a discharge position on the rearward portion of said boom and including cable winding means and cable guides carried by said front and rear overhanging ends of said boom.

8. In a scraper loading apparatus, a base, a supporting structure on said base, but a single rigid horizontal boom mounted between its ends on said supporting structure and overlying said base, said boom solely supported by said base and having a rearward boom portion freely overhanging a substantial distance the rear end of said base and a forward boom portion freely overhanging the front end of said base, a slide supported by said supporting structure and said rearward boom portion and along which a loading scraper is adapted to move, the front portion of said slide being forwardly and downwardly inclined, said overhanging front boom portion overlying the inclined forward portion of said slide and spaced from the latter, and a hoisting mechanism for operating the loading scraper for moving the latter up said inclined slide into discharge position on the rearward portion of said boom, said hoisting mechanism mounted on said front overhanging boom portion and supported entirely by the front overhanging end of the boom wholly independently of said front slide portion.

9. In a scraper loading apparatus, a portable base, a horizontal turntable on said base, a rigid horizontal boom mounted on said turntable and overlying said base, said boom having a rearward boom portion overhanging a substantial distance the rear end of said base and a forward boom portion overhanging the front end of said base, said turntable being rotatable with respect to said base to move said boom horizontally into different angular positions with respect to said base, a slide associated with said boom and supported on said turntable and along which a loading scraper is adapted to move, said slide having its forward portion downwardly inclined and extending beneath the forward overhanging end of said boom, said slide adapted to guide a scraper into discharging position on the rearward portion of said boom, and a hoisting mechanism for operating the scraper and including drum operated cables and cable guides mounted on the front and rear overhanging ends of said boom.

10. In a scraper loading apparatus, a portable base, a horizontal turntable on said base, a rigid horizontal boom mounted on said turntable and overlying said base, said boom having a rearward boom portion overhanging a substantial distance the rear end of said base and a forward boom portion overhanging the front end of said base, said turntable being rotatable with respect to said base to move said boom horizontally into different angular positions with respect to said base, a slide associated with said boom and supported on said turntable and along which a loading scraper is adapted to move, said slide having its forward portion downwardly inclined and extending beneath the forward overhanging end of said boom, said slide adapted to guide a scraper into discharging position on the rearward portion of said boom, and a hoisting mechanism for operating the scraper mounted on the front overhanging end of said boom and supported solely by said overhanging boom end wholly independently of said slide.

11. In a scraper loading apparatus, a portable base, a horizontal frame mounted between its ends on and supported solely by said base and having its rearward end freely overhanging a substantial distance the rear end of said base, the forward portion of said frame being downwardly inclined and freely overhanging the front end of said base, said frame providing a slideway beneath the front overhanging end of said frame and along which a loading scraper is adapted to move, a hoisting mechanism mounted on and supported by said downwardly inclined overhanging forward portion of said frame, said hoisting mechanism having pull and tail rope drums for actuating the loading scraper, and rope guiding means for guiding the pull and tail ropes of the hoisting mechanism, said guiding means including a pull rope guide sheave mounted on the rear end of said horizontal frame, and a tail rope guide mounted on the forward end of said frame.

12. In a scraper loading apparatus, a portable base, but a single rigid horizontal boom mounted between its ends on and overlying said base, said boom solely supported by said base and having a horizontal boom portion freely overhanging a substantial distance the rear end of said boom and a downwardly inclined forward boom portion freely overhanging the front end of said base, a slide associated with said boom beneath the forward overhanging boom portion of said boom and adapted to guide a loading scraper for moving the material to be loaded into discharge position on the rearward portion of said boom, and a hoisting mechanism adapted to operate the loading scraper and having cable winding drums and cable guiding means mounted on said front and rear overhanging boom portions.

13. In a scraper loading apparatus, a base, a supporting structure on said base, but a single rigid horizontal boom mounted between its ends on said supporting structure and overlying said base, said boom solely supported by said base and having a rearward boom portion freely overhanging a substantial distance the rear end of said base and a forward boom portion freely overhanging the front end of said base, a slide supported by said supporting structure and said rearward boom portion and extending beneath the forward boom portion of said boom and along which slide a loading scraper is adapted to move, the front portion of said slide being forwardly and downwardly inclined, said overhanging front boom portion overlying the inclined forward portion of said slide and spaced from the latter, and a hoisting mechanism for operating the loading scraper for moving the latter up said inclined slide into a discharge position on the rearward portion of said boom and including cable winding means and cable guides carried by said front and rear overhanging ends of said boom.

14. In a scraper loading apparatus, a portable base, a rigid horizontal boom overlying said base and supported in elevated position thereon, said boom having a rearward boom portion freely overhanging a substantial distance the rear end of said base and a forward boom portion freely overhanging the front end of said base, a slide associated with said boom and supported on said base and along which a loading scraper is adapted to move, said slide having its forward portion downwardly inclined and extending beneath the forward overhanging end of said boom, said slide adapted to guide a scraper into discharging position on the rearward overhanging portion of said boom rearwardly of said base, and a hoisting mechanism for operating the scraper and including drum operated cables and cable guides mounted on the front and rear overhanging ends of said boom at substantial distances respectively in front of and rearwardly of said base.

15. In a scraper loading apparatus, a portable base, a rigid horizontal boom overlying said base and supported in elevated position thereon, said boom having a rearward boom portion overhanging a substantial distance the rear end of said base and a forward boom portion overhanging the front end of said base, a slide associated with said boom and supported on said base and along which a loading scraper is adapted to move, said slide having its forward portion downwardly inclined and extending beneath the forward overhanging end of said boom, said slide adapted to guide a scraper into discharging position on the rearward overhanging portion of said boom rearwardly of said base, and a hoisting mechanism for operating the scraper mounted on the front overhanging end of said boom in advance of said base and supported solely by said overhanging boom end wholly independently of said slide.

16. In a scraper loading apparatus, a portable base, a horizontal frame structure mounted between its ends on and solely supported by said base and having its rearward end freely overhanging a substantial distance the rear end of said base and the forward portion of said frame structure freely overhanging the front end of said base, said horizontal frame structure providing a slideway having an inclined slide portion located beneath the front overhanging end of said frame structure and along which a loading scraper is adapted to move for moving loose material from the ground surface onto said slideway, and a hoisting mechanism mounted on and supported by said overhanging forward portion of said frame structure in advance of said base, said hoisting mechanism having pull and tail rope drums for actuating the loading scraper along said slideway.

17. In a scraper loading apparatus, a portable base, a horizontal frame structure mounted between its ends on and solely supported by said base and having its rearward end freely overhanging a substantial distance the rear end of said base, the forward portion of said frame structure in advance of said base being depressed and freely overhanging the front end of said base, said frame structure providing a slideway having an inclined portion located beneath the front overhanging end of said frame structure and along which a loading scraper is adapted to move for moving loose material from the ground surface onto said slideway, and a hoisting mechanism mounted on and supported by said depressed overhanging forward portion of said frame structure in advance of said base, said hoisting mechanism having pull and tail rope drums for actuating the loading scraper along said slideway.

18. In a scraper loading apparatus, a portable base, but a single rigid horizontal boom mounted on and overlying said base, said boom having a horizontal boom portion overhanging a substantial distance the rear end of said base and a downwardly inclined forward boom portion overhanging the front end of said base, a slide associated with said boom and adapted to guide a loading scraper for moving the material to be loaded into discharge position on the rearward portion of said boom, said slide having an inclined slideway spaced from and located beneath the downwardly inclined, overhanging, forward boom portion, and a hoisting mechanism adapted to operate the loading scraper and having cable winding drums and cable guiding means mounted on said front and rear overhanging boom portions.

ROBERT C. OSGOOD.
LESLIE A. CURRIER.